US 9,407,136 B2

(12) United States Patent
Hung et al.

(10) Patent No.: US 9,407,136 B2
(45) Date of Patent: Aug. 2, 2016

(54) PASSIVE COUPLED-INDUCTOR SOFT-SWITCHING CIRCUIT OF POWER FACTOR CORRECTORS

(71) Applicant: ASIAN POWER DEVICES INC., Taoyuan (TW)

(72) Inventors: Tsung-Liang Hung, Taoyuan (TW); Yeu-Torng Yau, Taoyuan (TW)

(73) Assignee: Asian Power Devices Inc., Taoyuan (TW)

( * ) Notice: Subject to any disclaimer, the term of this patent is extended or adjusted under 35 U.S.C. 154(b) by 0 days.

(21) Appl. No.: 14/747,797

(22) Filed: Jun. 23, 2015

(65) Prior Publication Data
US 2016/0043631 A1 Feb. 11, 2016

(30) Foreign Application Priority Data

Aug. 11, 2014 (TW) ............................. 103127558 A

(51) Int. Cl.
*H02M 1/42* (2007.01)
*H02M 1/34* (2007.01)
*H02M 3/156* (2006.01)
*H02M 1/00* (2006.01)

(52) U.S. Cl.
CPC .............. *H02M 1/4225* (2013.01); *H02M 1/34* (2013.01); *H02M 1/42* (2013.01); *H02M 1/4208* (2013.01); *H02M 3/156* (2013.01); *H02M 2001/0058* (2013.01); *H02M 2001/346* (2013.01); *Y02B 70/126* (2013.01); *Y02B 70/1491* (2013.01)

(58) Field of Classification Search
CPC ..... H02M 1/34; H02M 2001/346; H02M 1/42; H02M 1/4208; H02M 1/4225; H02M 3/156
See application file for complete search history.

(56) References Cited

U.S. PATENT DOCUMENTS

| 6,169,671 B1 * | 1/2001 | Mao | H02M 1/34 363/126 |
| 2008/0031016 A1 * | 2/2008 | Lin | H02M 1/34 363/21.03 |
| 2015/0357910 A1 * | 12/2015 | Murakami | H05B 33/0815 363/89 |

* cited by examiner

*Primary Examiner* — Fred E. Finch, III
*Assistant Examiner* — Rafael O. De León Domenech
(74) *Attorney, Agent, or Firm* — Li-Jen Shen

(57) ABSTRACT

A passive coupled-inductor soft-switching circuit of a power factor corrector is provided. The passive coupled-inductor soft-switching circuit includes a power input terminal, a first inductor, a first diode, a power output terminal, a power switch and a buffer circuit. The first inductor has a first terminal and a second terminal, wherein the first terminal of the first inductor is electrically coupled with the power input terminal. The first diode has a positive terminal and a negative terminal, wherein the positive terminal of the first diode is electrically coupled with the second terminal of the first inductor. The power output terminal is electrically coupled with the negative terminal of the first diode. The buffer circuit is electrically coupled with the power switch. By using the buffer circuit, the voltage and current have phase interlacing shifts and thereby reducing the switching loss.

5 Claims, 7 Drawing Sheets

PASSIVE COUPLED-INDUCTOR SOFT-SWITCHING CIRCUIT OF POWER FACTOR CORRECTORS

FIELD OF THE INVENTION

The present invention relates to a power factor corrector, and more particularly to a passive coupled-inductor soft-switching circuit of power factor correctors in continuous conduction mode.

BACKGROUND OF THE INVENTION

With the advancement of technology and the development of economic, the demand switching converter increases. In recent years, because the significant advances in power electronic technology and the trend to thin and light, the power converter in switching converter is also required to have thin and light design. Thus, in recent years, the switching power converters with thin and light design have gradually replace the conventional linear power converters and become the main trend of power converters. In addition, besides having the thin and light features, the switching converter also improve the efficiency and quality of converters.

Basically, power factor corrector (PFC) can be operated in continuous conduction mode (CCM) or discontinuous conduction mode (DCM). For low-power systems, generally the power factor correctors adopt the discontinuous conduction mode to control the switching mode. On the contrary, for high-power systems, generally the power factor correctors adopt the continuous conduction mode.

In general, when a conventional boost converter in continuous conduction mode has a hard switching, some power may be lost when the power switch is OFF and ON due to the voltage and current delays in the instantaneous moment of OFF and ON; wherein the power loss is so-called switching loss. Basically, the switching loss issue can be solved by using external circuit to make the voltage and current have phase interlacing shifts.

SUMMARY OF THE INVENTION

Therefore, one object of the present invention is to provide a passive coupled-inductor soft-switching circuit power factor correctors capable of using external circuit to make the voltage and current have phase interlacing shifts, thereby reducing the switching loss.

The present invention provides a passive coupled-inductor soft-switching circuit of a power factor corrector. The passive coupled-inductor soft-switching circuit includes a power input terminal, a first inductor, a first diode, a power output terminal, a power switch and a buffer circuit. The first inductor has a first terminal and a second terminal, wherein the first terminal of the first inductor is electrically coupled with the power input terminal. The first diode has a positive terminal and a negative terminal, wherein the positive terminal of the first diode is electrically coupled with the second terminal of the first inductor. The power output terminal is electrically coupled with the negative terminal of the first diode. The buffer circuit is electrically coupled with the power switch. The buffer circuit includes a coupled inductor, a first capacitor, a second diode, a third diode, a second capacitor and a fourth diode. The coupled inductor includes a first winding set and a second winding set. Both of the first winding set and the second winding set have a first terminal and a second terminal, wherein the first terminal of the first winding set is electrically coupled between the first inductor and the first diode and the second terminal of the first winding set is electrically coupled with the power switch. The first capacitor has a first terminal and a second terminal, wherein the first terminal of the first capacitor is electrically coupled with the first terminal of the first winding set. The second diode has a positive terminal and a negative terminal, wherein the positive terminal of the second diode is electrically coupled with the second terminal of the first capacitor and the negative terminal of the second diode is electrically coupled between the first diode and the power output terminal. The third diode has a positive terminal and a negative terminal, wherein the positive terminal of the third diode is electrically coupled between the first winding set and the power switch. The second capacitor has a first terminal and a second terminal, wherein the first terminal of the second capacitor is electrically coupled with the negative terminal of the third diode and the second terminal of the second capacitor is electrically coupled with the negative terminal of the second diode. The fourth diode has a positive terminal and a negative terminal, wherein the positive terminal of the fourth diode is electrically coupled with the first terminal of the second winding set in series and the negative terminal of the fourth diode is electrically coupled between the first capacitor and the second diode. The second terminal of the second winding set is electrically coupled between the second capacitor and the third diode.

In summary, by using the buffer circuit, the voltage and current have phase interlacing shifts and thereby reducing the switching loss.

BRIEF DESCRIPTION OF THE DRAWING

The present disclosure will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
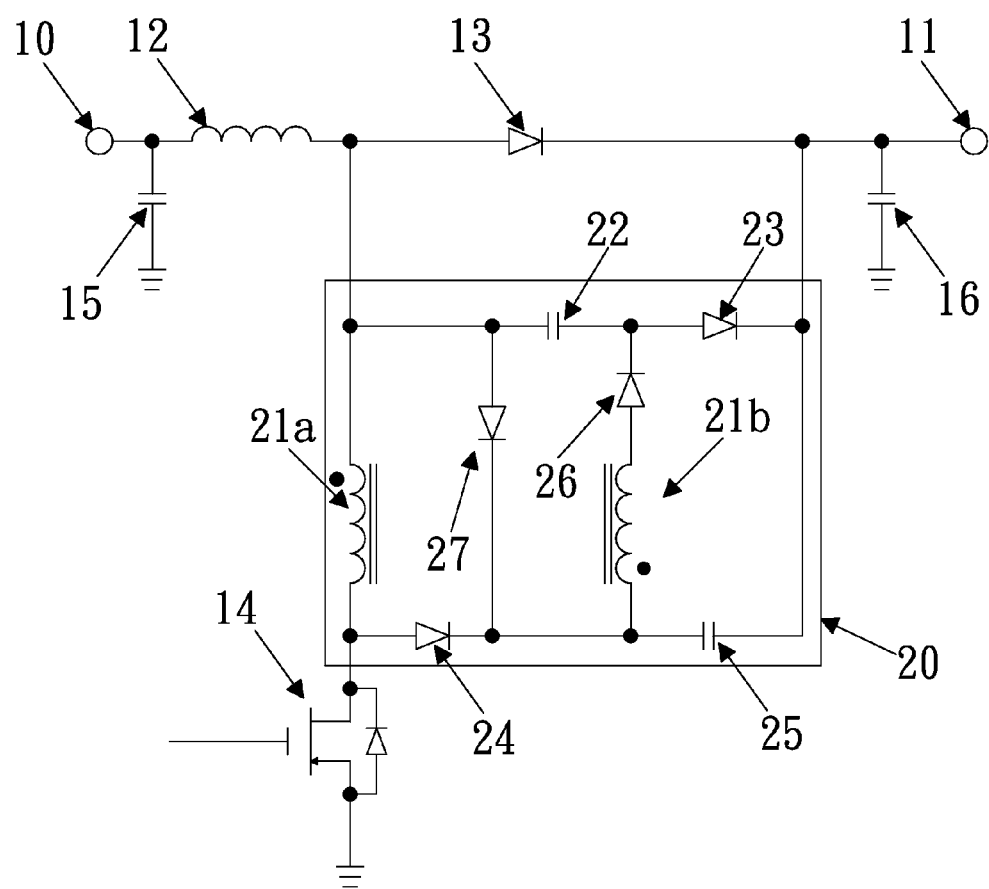
FIG. 1 is schematic circuit view of a passive coupled-inductor soft-switching circuit of a power factor corrector (PFC) in accordance with an embodiment of the present invention.
Figure 2:
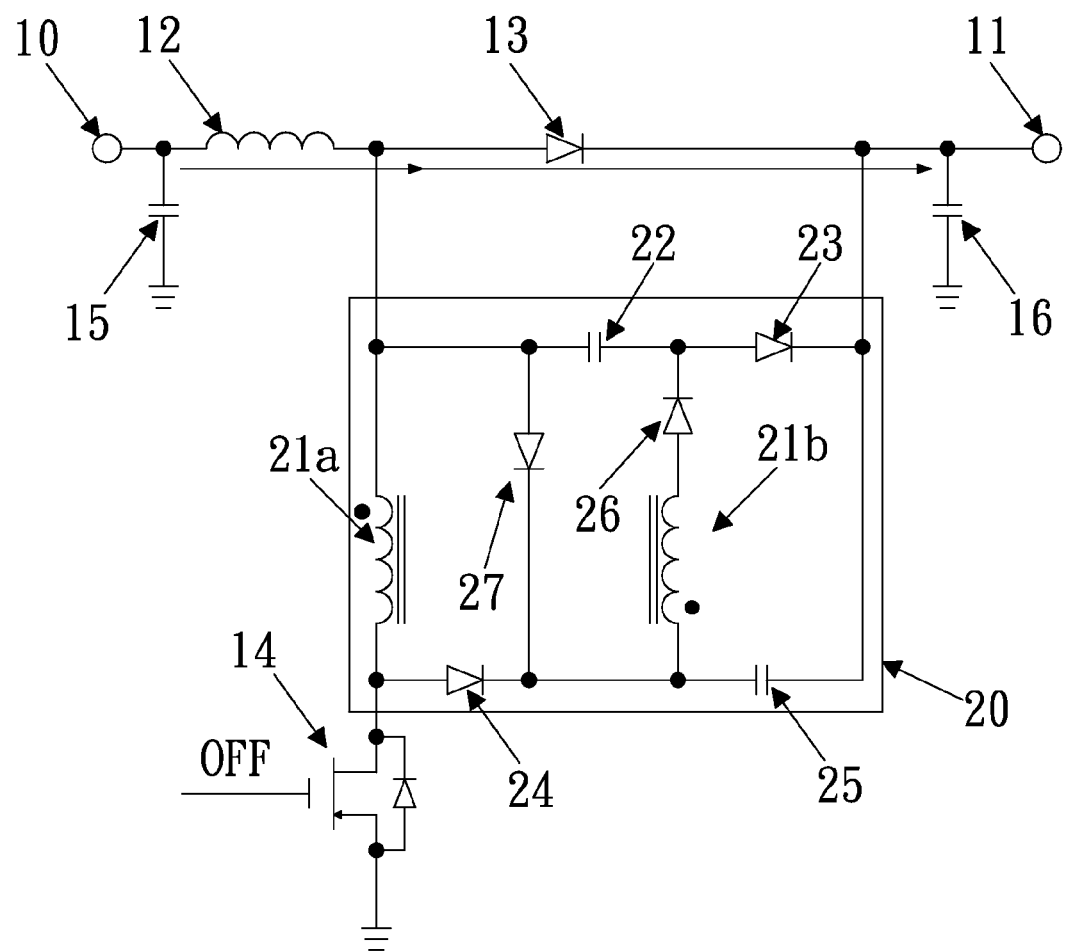
FIGS. 2-7 are schematic circuit views for illustrating an operating process of a passive coupled-inductor soft-switching circuit of a power factor corrector (PFC) in accordance with an embodiment of the present invention.

FIG. 1 is schematic circuit view of a passive coupled-inductor soft-switching circuit of a power factor corrector (PFC) in accordance with an embodiment of the present invention. As shown in FIG. 1, the passive coupled-inductor soft-switching circuit in the present embodiment includes a power input terminal 10, a power output terminal 11, a first inductor 12, a first diode 13, a power switch 14, a third capacitor 15, a fourth capacitor 16 and a buffer circuit 20.

The power input terminal 10 is electrically coupled with a first terminal of the first inductor 12. The third capacitor 15 is electrically coupled between the power input terminal 10 and the first inductor 12. The positive terminal of the first diode 13 is electrically coupled with the second terminal of the first inductor 12. The negative terminal of the first diode 13 is electrically coupled with the power output terminal 11. The fourth capacitor 16 is electrically coupled with the power output terminal 11.

The buffer circuit 20 is electrically coupled with the power switch 14. The buffer circuit 20 includes a coupled inductor 21, a first capacitor 22, a second diode 23, a third diode 24, a second capacitor 25, a fourth diode 26 and a fifth diode 27. In one embodiment, the power switch 14 may be a metal-semiconductor field effect transistor (MESFET) or other equivalent elements and the coupled inductor 21 mainly includes a first winding set 21a and a second winding set 21b.

The first terminal of the first winding set 21a of the coupled inductor 21 is electrically coupled between the first inductor 12 and the first diode 13. The second terminal of the first winding set 21a is electrically coupled with the power switch 14. The first terminal of the first winding set 21a is also electrically coupled with the first terminal of the first capacitor 22 and the positive terminal of the fifth diode 27. The positive terminal of the second diode 23 is electrically coupled with the second terminal of the first capacitor 22 and the negative terminal of the fourth diode 26. The positive terminal of the fourth diode 26 is electrically coupled with the first terminal of the second winding set 21b in series. The positive terminal of the third diode 24 is electrically coupled between the coupled inductor 21 and the power switch 14. The negative terminal of the third diode 24 is electrically coupled with the negative terminal of the fifth diode 27, the second terminal of the second winding set 21b and the first terminal of the second capacitor 25. The negative terminal of the second diode 23 is electrically coupled between the first diode 13 and the power output terminal 11. The second terminal of the second capacitor 25 is electrically coupled with the negative terminal of the second diode 23. The fifth diode 27 in the present embodiment is a protection circuit element and configured to prevent the passive coupled-inductor soft-switching circuit from being damaged by an abnormal current.

The circuit structure of the passive coupled-inductor soft-switching circuit in the present embodiment has been described above, and the operating process of the passive coupled-inductor soft-switching circuit will be described as follow with a reference of FIGS. 2-7. Herein it is to be noted that the power input terminal 10 is configured to provide a source of power and the third capacitor 15 is configured to provide a filtering function. Please refer to FIG. 2. Initially, the power switch 14 is OFF. The power provided by the power input terminal 10 is directly provided to the first inductor 12 and the first diode 13. Then, the power is outputted by the power output terminal 11 and simultaneously charging the fourth capacitor 16.

Figure 3:
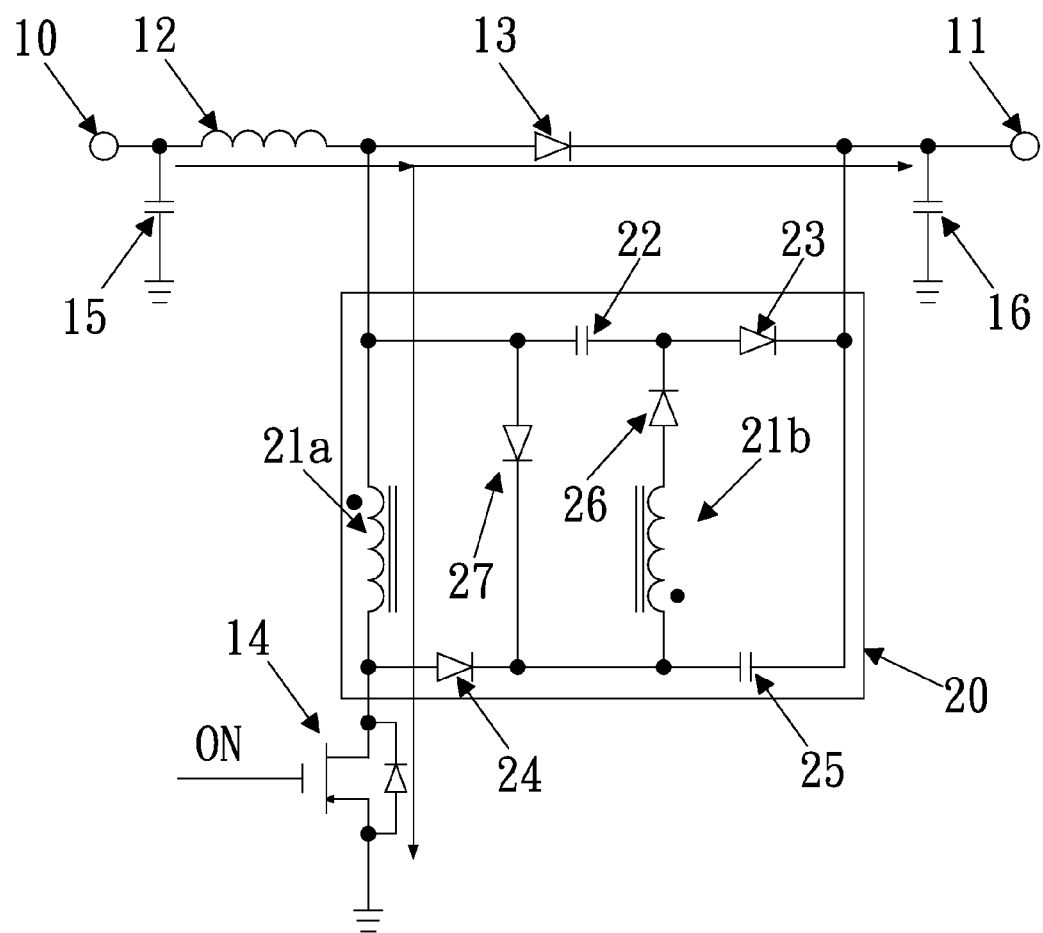
Figure 4:
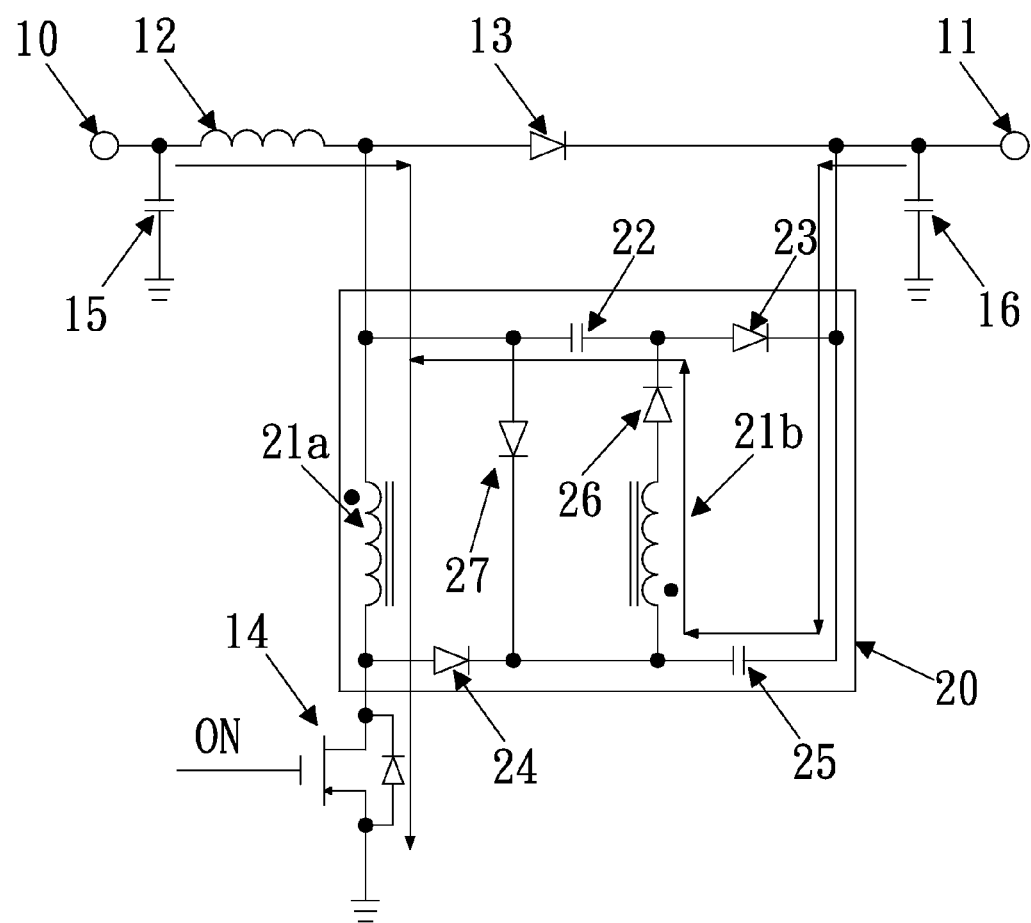
Figure 5:
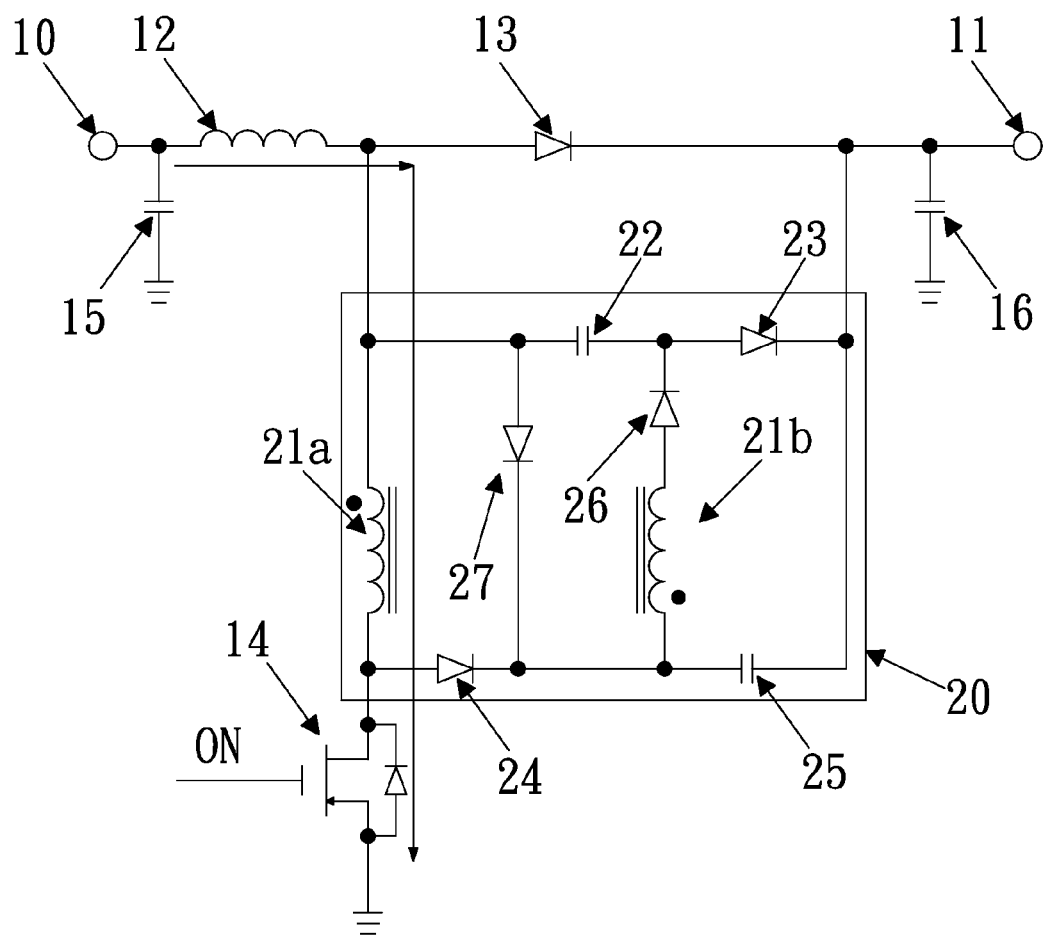

Please refer to FIGS. 3, 4 and 5. Then, the power switch 14 is ON. A portion of the power provided by the power input terminal 10 sequentially flows through the first winding set 21a and the power switch 14, and correspondingly the current flowing through the first diode 13 start to decrease (herein the input current is assumed as a constant in a switching cycle). Eventually, all the power provided by the power input terminal 10 sequentially flows through the first winding set 21a and the power switch 14, and the fourth capacitor 16 starts to be discharged. Specifically, the discharged power sequentially flows through the second capacitor 25, the second winding set 21b, the fourth diode 26, the first capacitor 22, the first winding set 21a and the power switch 14. Meanwhile, the first capacitor 22 and the second capacitor 25 are charged by the power discharged by the fourth capacitor 16. Eventually, when all the power stored in the fourth capacitor 16 is discharged, all the power provided by the power input terminal 10 sequentially flows through the coupled inductor 21 and the power switch 14.

Figure 6:
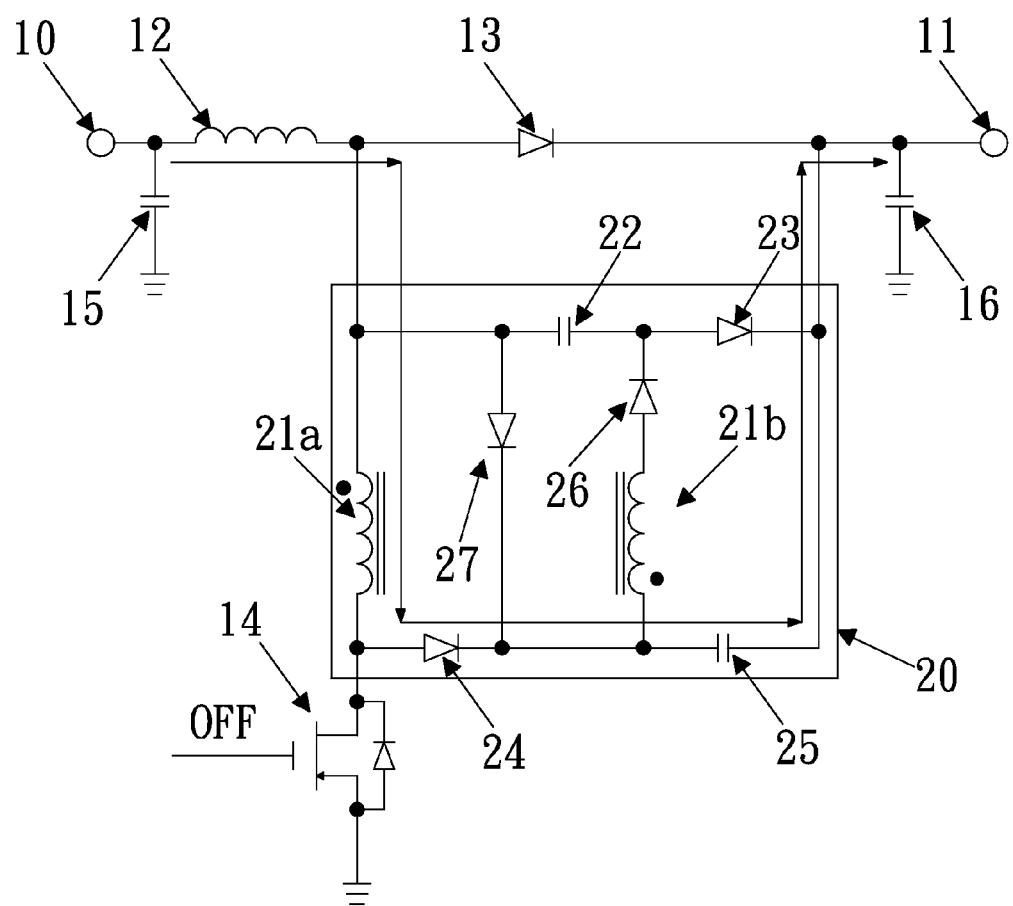
Figure 7:
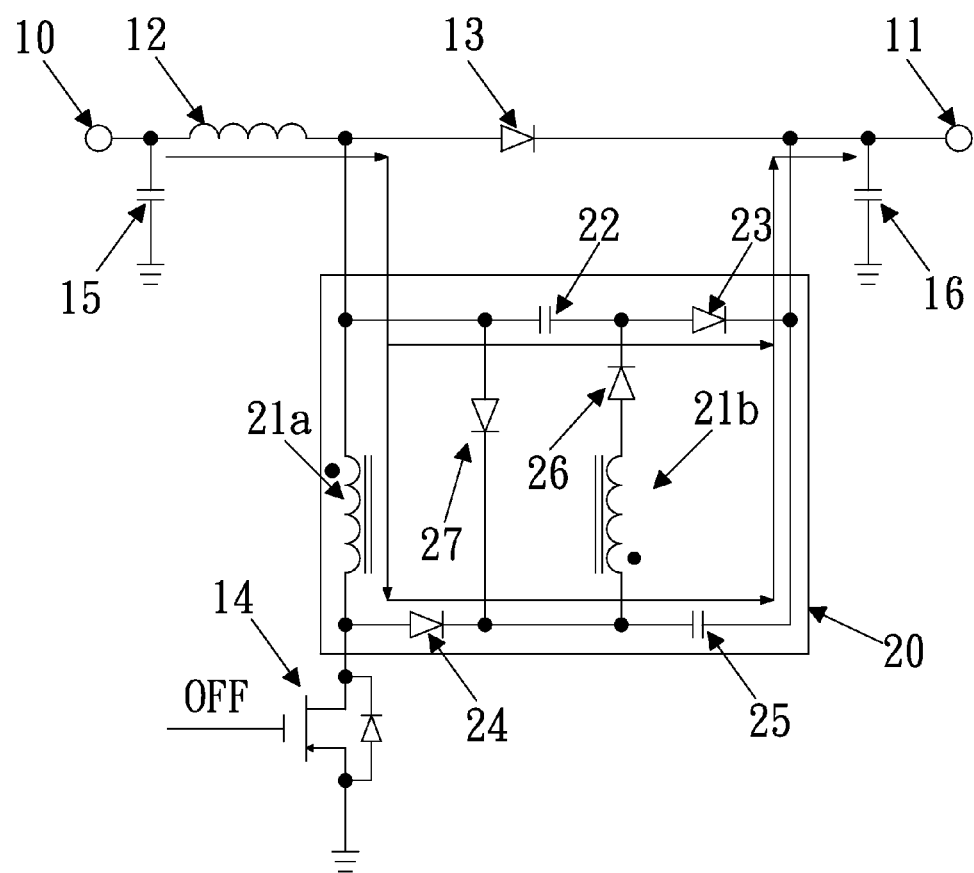

Please refer to FIGS. 6 and 7. Then, the power switch 14 is OFF. The power provided by the first inductor 12 sequentially flows through the first winding set 21a, the third diode 24 and the second capacitor 25. Then, when the power provided by the first winding set 21a start to decrease, the power provided by the first inductor 12 start to sequentially flow through the first capacitor 22 and the second diode 23. Eventually, when the first winding set 21a, the first capacitor 22 and the second capacitor 25 stop providing power, the operating process of the passive coupled-inductor soft-switching circuit goes back to the initial state (FIG. 1).

Through the above description, it is to be noted that because the waveforms of current and voltage have phase interlacing shifts at the switching time, the soft-switching is achieved and the energy loss caused by switching is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A passive coupled-inductor soft-switching circuit of a power factor corrector, comprising:
    a power input terminal;
    a first inductor having a first terminal and a second terminal, wherein the first terminal of the first inductor is electrically coupled with the power input terminal;
    a first diode having a positive terminal and a negative terminal, wherein the positive terminal of the first diode is electrically coupled with the second terminal of the first inductor;
    a power output terminal electrically coupled with the negative terminal of the first diode;
    a power switch; and
    a buffer circuit electrically coupled with the power switch, the buffer circuit comprising:
        a coupled inductor comprising a first winding set and a second winding set, both of the first winding set and the second winding set having a first terminal and a second terminal, wherein the first terminal of the first winding set is electrically coupled between the first inductor and the first diode, and the second terminal of the first winding set is electrically coupled with the power switch;
        a first capacitor having a first terminal and a second terminal, wherein the first terminal of the first capacitor is electrically coupled with the first terminal of the first winding set;
        a second diode having a positive terminal and a negative terminal, wherein the positive terminal of the second diode is electrically coupled with the second terminal of the first capacitor, and the negative terminal of the second diode is electrically coupled between the first diode and the power output terminal;
        a third diode having a positive terminal and a negative terminal, wherein the positive terminal of the third diode is electrically coupled between the first winding set and the power switch;
        a second capacitor having a first terminal and a second terminal, wherein the first terminal of the second capacitor is electrically coupled with the negative terminal of the third diode, and the second terminal of the second capacitor is electrically coupled with the negative terminal of the second diode; and a fourth diode having a positive terminal and a negative terminal, wherein the positive terminal of the fourth diode is electrically coupled with the first terminal of the second winding set in series, and the negative terminal of the fourth diode is electrically coupled between the first capacitor and the second diode, wherein the second terminal of the second winding set is electrically coupled between the second capacitor and the third diode.

2. The passive coupled-inductor soft-switching circuit according to claim 1, wherein the power switch is a metal-semiconductor field effect transistor (MESFET).

3. The passive coupled-inductor soft-switching circuit according to claim 2, further comprising a third capacitor electrically coupled between the power input terminal and the first inductor.

4. The passive coupled-inductor soft-switching circuit according to claim 3, further comprising a fourth capacitor electrically coupled with the power output terminal.

5. The passive coupled-inductor soft-switching circuit according to claim 4, further comprising a fifth diode having a positive terminal and a negative terminal, wherein the positive terminal of the fifth diode is electrically coupled with the first terminal of the first capacitor, and the negative terminal of the fifth diode is electrically coupled between the second capacitor and the third diode.

\* \* \* \* \*